(12) United States Patent
Dittmar et al.

(10) Patent No.: US 6,662,676 B2
(45) Date of Patent: Dec. 16, 2003

(54) PARKING BRAKE SYSTEM HAVING MULTI-TOOTH, SELF-ENGAGING SELF-ADJUST PAWL

(75) Inventors: John Thomas Dittmar, Charlevoix, MI (US); Michael Slumba, Clarkston, MI (US); James Sells, Moberly, MO (US)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/911,558

(22) Filed: Jul. 24, 2001

(65) Prior Publication Data

US 2003/0019317 A1 Jan. 30, 2003

(51) Int. Cl.[7] .................................................. G05G 5/06
(52) U.S. Cl. ........................................ 74/501.5; 74/535
(58) Field of Search ........................... 74/501.5 R, 533, 74/535, 536, 537, 577 R, 577 S, 577 M, 575

(56) References Cited

U.S. PATENT DOCUMENTS

| | | | |
|---|---|---|---|
| 5,001,942 A | 3/1991 | Boyer | 74/535 |
| 5,303,610 A | 4/1994 | Noel | 74/535 |
| 5,467,666 A | 11/1995 | Soucie | 74/575 |

*Primary Examiner*—David A. Bucci
*Assistant Examiner*—Julie K. Smith
(74) *Attorney, Agent, or Firm*—Richard Mescher; Casimir Kizeck (57) ABSTRACT

A self adjusting parking brake system which automatically removes slack from a parking brake cable includes a fixed support and a hand-operated lever pivotably connected to the support for movement between brake-releasing and brake-engaging positions. A locking mechanism releasably maintains the lever in the brake-engaging position. The locking mechanism includes a main ratchet having a plurality of ratchet teeth and a main pawl having a pawl tooth engaging the plurality of ratchet teeth. A self-adjust mechanism connects the cable with the lever. The self-adjust mechanism includes an adjuster ratchet having a plurality of ratchet teeth and an adjuster pawl having a plurality pawl teeth. Only one of the plurality of pawl teeth fully engages the ratchet teeth at any one time. The adjuster pawl pivots about a pivot axis and has an approach angle of greater than forty-five degrees.

20 Claims, 5 Drawing Sheets

PARKING BRAKE SYSTEM HAVING MULTI-TOOTH, SELF-ENGAGING SELF-ADJUST PAWL

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

1. Field of the Invention

The present invention generally relates to a self-adjust pawl and ratchet mechanism for a parking brake system and, more particularly, to such a mechanism which ensures positive full engagement between the pawl and the ratchet.

2. Background of the Invention

It is well known in the prior art for a vehicle parking brake system to include self-adjust means for automatically disengaging a brake cable from an operating handle or lever when the lever is in a brake release position in order to remove slack from the brake cable. For example, see U.S. Pat. Nos. 4,841,798, 4,872,368, 5,001,942, 5,235,867, and 5,467,666, the disclosures of which are expressly incorporated herein in their entirety by reference.

In these known self-adjust means, an adjuster pawl and ratchet are provided in addition to the main pawl and ratchet. Typically, the brake cable is connected to the adjuster ratchet and the adjuster pawl is pivotally mounted to the operating lever whereby load is transferred from the ratchet to the operating lever via the pawl and its pivot pin. The adjuster pawl is automatically released from the adjuster ratchet when the operating lever is returned to the brake-release position. If the adjuster pawl is only partially engaged with the adjuster ratchet, a tooth may chip and/or slip out of engagement when subjected to full system load.

In an attempt to solve this problem and provide positive full engagement between the adjuster pawl and ratchet teeth, cam-out and cam-in pins or abutments were developed. It is customary to provide the cam-out pin or abutment on the housing to positively disengage the adjuster pawl from the adjuster ratchet when the operating lever is moved to the brake-release position. When the operating lever is pivoted toward the brake-engaging position, the spring-biased adjuster pawl automatically pivots toward engagement with the adjuster ratchet. The cam-in pin or abutment is typically provided to positively engage the adjuster pawl with the adjuster ratchet when the operating lever is moved to the brake-applied position. The cam-out and cam-in surfaces are preferably shaped and positioned to achieve full engagement between the adjuster pawl and the adjuster ratchet by eliminating top-on-top and partial-engagement conditions between the teeth. While these attempts may be somewhat successful, partial engagement and accidental disengagement of the adjuster pawl still occurs. Accidental disengagement and/or partial engagement can still be a problem due to tolerances of components and/or deflection of components. Accordingly, there is a need in the art for an improved adjuster mechanism for a parking brake system which reduces and/or eliminates partial engagement and/or accidental disengagement.

SUMMARY OF THE INVENTION

The present invention provides a parking brake system which overcomes at least some of the above-noted problems of the related art. According to the present invention, a parking brake system of the self-adjust type for automatically removing slack from a parking brake cable includes, in combination, a fixed support and a lever pivotably connected to the support for movement between brake-releasing and brake-engaging positions. A locking mechanism releasably maintains the lever in the brake-engaging position. The locking mechanism includes a main ratchet fixed relative to the support and having a plurality of ratchet teeth and a main pawl pivotably connected with the lever and having a pawl tooth for releasable engagement with the ratchet teeth of the main ratchet. A self-adjust mechanism releasably connects the parking brake cable with the lever. The self-adjust mechanism includes an adjuster ratchet connected to the parking brake cable and having a plurality of ratchet teeth and an adjuster pawl pivotably connected with the lever and having at least one pawl tooth releasably engaging the ratchet teeth of the adjuster ratchet. The adjuster pawl is pivotable relative to the lever about a pivot axis. A pawl spring member biases the adjuster pawl toward engagement with the adjuster ratchet. The adjuster pawl has an approach angle extending between a tangential force direction and a force direction from a tooth contact point engaging the adjuster ratchet to the pivot axis of the adjuster pawl. The approach angle is greater than 45 degrees and preferably within the range of about 55 degrees to about 75 degrees.

According to another aspect of the present invention, a parking brake system of the self-adjust type for automatically removing slack from a parking brake cable includes, in combination, a fixed support and a lever pivotably connected to the support for movement between brake-releasing and brake-engaging positions. A locking mechanism releasably maintains the lever in the brake-engaging position. The locking mechanism includes a main ratchet fixed relative to the support and having a plurality of ratchet teeth and a main pawl pivotably connected with the lever and having a pawl tooth releasably engaging the plurality ratchet teeth of the main ratchet. A self-adjust mechanism releasably connects the parking brake cable with the lever. The self-adjust mechanism includes an adjuster ratchet connected to the parking brake cable and having a plurality of ratchet teeth and an adjuster pawl pivotably connected with the lever and having a plurality of pawl teeth releasably engaging the plurality of ratchet teeth of the adjuster ratchet. A pawl spring member biases the adjuster pawl toward engagement with the adjuster ratchet. The plurality of pawl teeth of the adjuster pawl are adapted such that only one of the plurality of pawl teeth of the adjuster pawl fully engages the plurality ratchet teeth of the adjuster ratchet at any given time. Preferably, the plurality of pawl teeth of the adjuster pawl are spaced side-by-side to form a substantially linear row and the plurality of ratchet teeth of the adjuster ratchet are spaced side-by-side to form a substantially arcuate row.

According to yet another aspect of the present invention, a parking brake system of the self-adjust type for automatically removing slack from a parking brake cable includes, in combination, a fixed support and a hand-operated lever pivotably connected to the support for movement between brake-releasing and brake-engaging positions. A locking mechanism releasably maintains the lever in the brake-engaging position. The locking mechanism includes a main ratchet fixed relative to the support and having a plurality of ratchet teeth and a main pawl pivotably connected with the lever and having a pawl tooth releasably engaging the plurality of ratchet teeth of the main ratchet. A self-adjust mechanism releasably connects the parking brake cable with the lever. The self-adjust mechanism includes an adjuster ratchet connected to the parking brake cable and having a plurality of ratchet teeth and an adjuster pawl pivotably connected with the lever and having three pawl teeth releasably engaging the plurality ratchet teeth of the adjuster ratchet. The adjuster pawl is pivotable relative to the lever about a pivot axis. A pawl spring member biases the adjuster pawl toward engagement with the adjuster ratchet. The adjuster pawl has an approach angle extending between a tangential force direction and a force direction from a tooth contact point engaging the adjuster ratchet to the pivot axis of the adjuster pawl and wherein the approach angle is within the range of about 55 degrees to about 75 degrees. The three pawl teeth of the adjuster pawl are adapted such that only one of the three pawl teeth fully engages the plurality ratchet teeth of the adjuster ratchet at any given time. Preferably, the three pawl teeth of the adjuster pawl are spaced side-by-side to form a substantially linear row and the plurality of ratchet teeth of the adjuster ratchet are spaced side-by-side to form a substantially arcuate row.

From the foregoing disclosure and the following more detailed description of various preferred embodiments it will be apparent to those skilled in the art that the present invention provides a significant advance in the technology and art of parking brake systems. Particularly significant in this regard is the potential the invention affords for providing a high quality, reliable, low cost assembly which does not accidently release the parking brake. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

It should be understood that the appended drawings are not necessarily to scale, presenting a somewhat simplified representation of various preferred features illustrative of the basic principles of the invention. The specific design features of a parking brake system as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the parking brake system illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, that is, to the left within the plane of the paper in FIG. 1 and aft or rearward refers to a direction toward the rear of the vehicle, that is, to the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved parking brake system disclosed herein. The following detailed discussion of various alternative and preferred embodiments will illustrate the general principles of the invention with reference to a preferred embodiment. Other embodiments suitable for other applications, such as a foot-operated parking brake system, will be apparent to those skilled in the art given the benefit of this disclosure.

Figure 1:
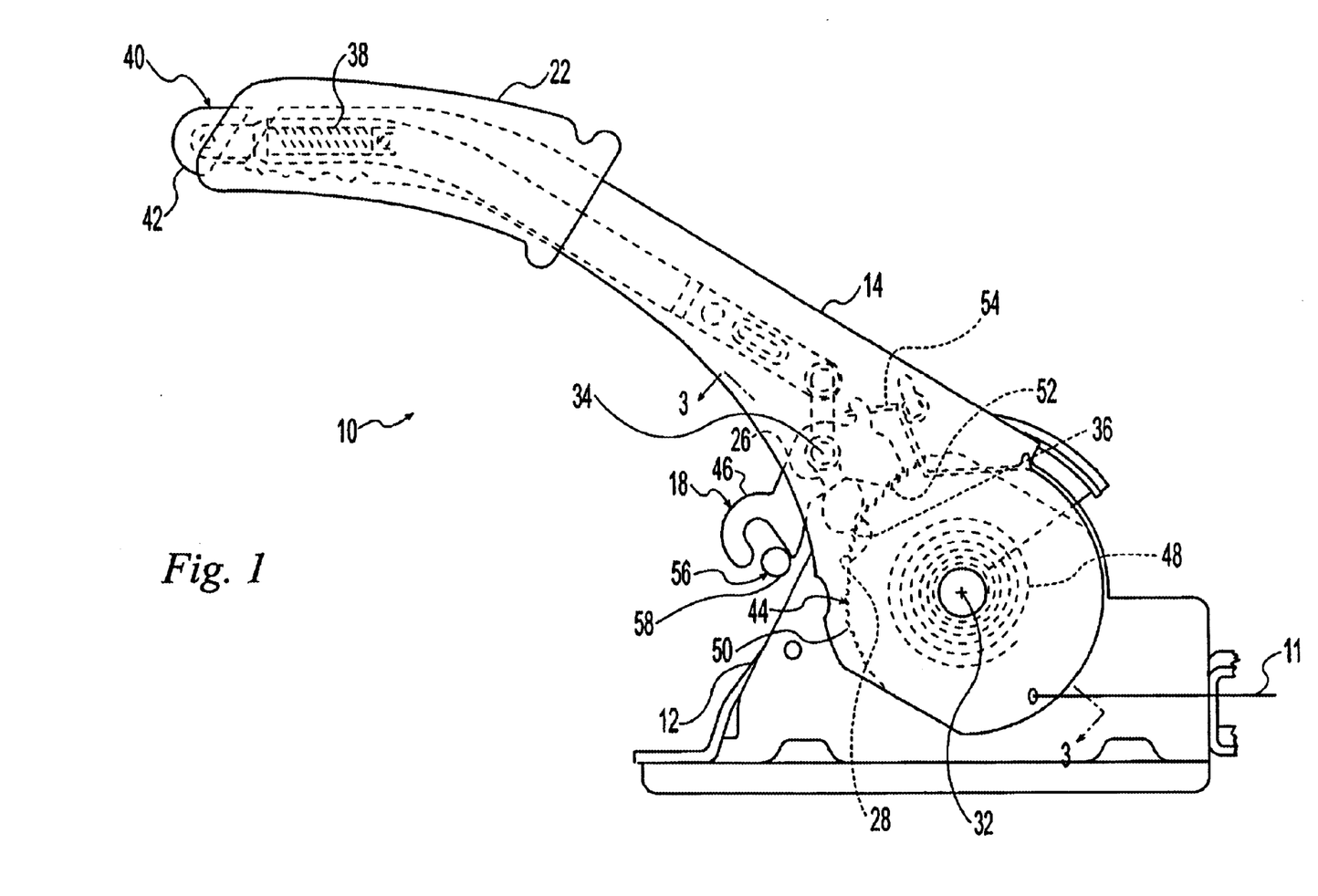
FIG. 1 is a right side elevational view of a hand-lever parking brake according to the present invention.
Figure 2:
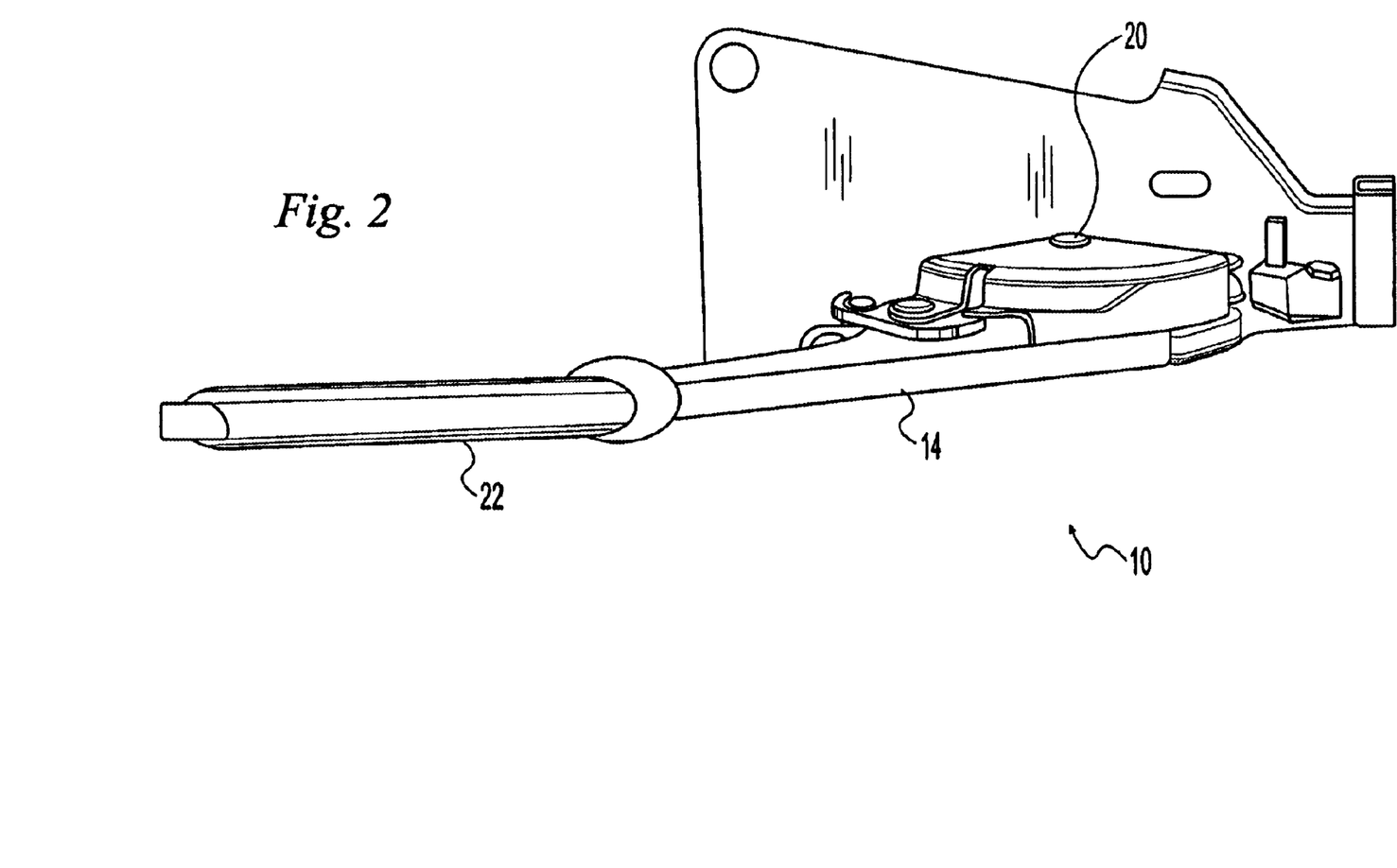
FIG. 2 is a top plan view of the parking brake of FIG. 1.
Figure 3:
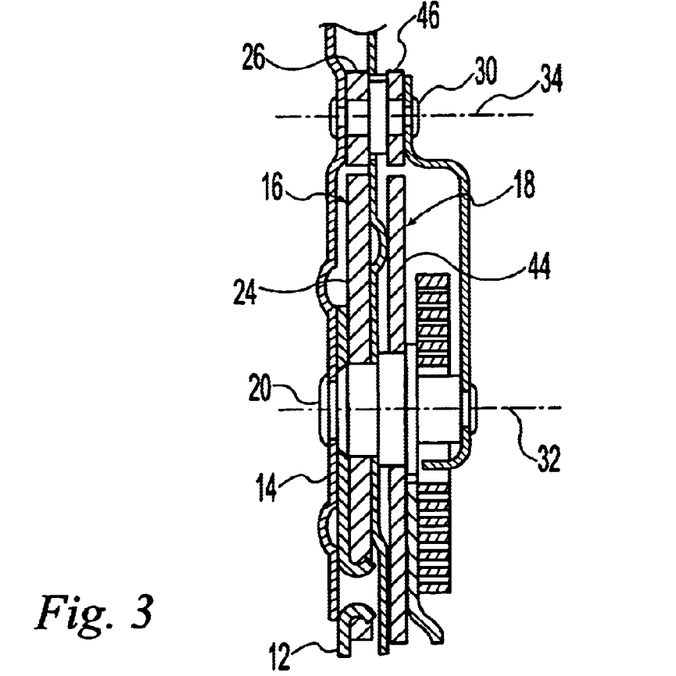
FIG. 3 is a sectional view taken along line 3—3 of FIG. 1.

Referring now to the drawings, FIGS. 1 to 3 show a parking brake system 10 of the cable-slack removing or self-adjust type according to a preferred embodiment of the present invention. The parking brake system 10 is adapted to tension and untension a parking brake cable 11 to respectively engage and release a parking brake. The illustrated parking brake system 10 includes a fixed support or housing 12, an operating lever 14 pivotably attached to the support 12 for movement between a cable untensioning or brake-releasing position and a cable tensioning or brake-engaging position, a locking mechanism 16 adapted to releasably maintain the operating lever 14 in the brake-engaging position, and a self-adjust mechanism adapted to releasably connect the parking-brake cable 11 with the operating lever 14 to automatically remove slack in the parking brake cable 11.

The fixed support 12 is preferably rigidly secured to the vehicle. The operating lever 14 is pivotably connected to the support 12 by a pivot pin 20. The illustrated operating lever 14 is adapted as a hand operated lever and is provided with a hand grip 22 at its free end. The operating lever 14 selectively pivots about the pivot pin 20 and is maintained in the brake engaging position by the locking mechanism 16 which operates between the operating lever 14 and the support 12 as discussed in more detail hereinafter.

The locking mechanism 16 is adapted to releasably maintain the operating lever 14 in the brake-engaging position, and preferably in any other desired position. The locking mechanism 16 includes a main ratchet 24 and a main pawl 26 adapted to releasably engage the main ratchet 24. The main ratchet 24 is secured to the support 12 so that it is substantially fixed against movement relative the support 12. The main ratchet 24 has a plurality of ratchet teeth 28 which are spaced in a side-by-side manner to form an arcuate row of the ratchet teeth 28.

The main pawl 26 is connected with the operating lever 14 such that the main pawl 26 is carried by the operating lever 14 as the operating lever 14 pivots about the pivot pin 20. The main pawl 26 is pivotably connected to the operating lever 14 by a second pivot pin 30. The second pivot pin 30 is substantially parallel to the first pivot pin 20 to form substantially parallel pivot axes 32, 34. The main pawl 26 has a pawl tooth 36 for releasable engagement with the plurality of ratchet teeth 28 of the main ratchet 24. A main pawl spring member 38 is provided which biases the main pawl 26 into releasable engagement with the main ratchet 24 to maintain the operating lever 14 in its position relative to the support 12. The main ratchet 24 and the main pawl 26 cooperate so that the operating lever 14 can only move in an upward direction (clockwise as viewed in FIG. 1) toward the brake engaging position. A main pawl actuator 40 is provided so that the operator can selectively disengage the main pawl 26 from the main ratchet 24. With the main pawl 26 disengaged, the operating lever is free to downwardly pivot (counterclockwise as viewed in FIG. 1) about the pivot pin 20 relative to the support 12 so that the operator can move the operating lever 14 to the brake releasing position. In the illustrated embodiment, the actuator 40 includes a button 42 located at the free end of the operating lever 14 near the hand grip 22. The button 42 is operatively connected to the main pawl 26 such that depression of the button 42 overcomes the bias of the spring member 38 to pivot the main pawl 26 out of engagement with the main ratchet 24.

The self-adjust mechanism 18 is adapted to releasably connect the parking brake cable 11 with the operating lever 14 so that the parking brake cable 11 is automatically released from the operating lever 12 to remove slack from the parking brake cable 11 when the operating lever 14 s in the brake-releasing position. The self-adjust mechanism 18 includes an adjuster ratchet 44 and an adjuster pawl 46. The adjuster ratchet 44 rotates freely about the first pivot pin 20. An adjuster ratchet spring member 48 biases the adjuster ratchet 44 in a cable slack removing direction (clockwise as viewed in FIG. 1). The illustrated adjuster ratchet spring member 48 is a spiral torsion spring mounted concentrically about the pivot pin 20. The parking brake cable 11 is operably connected to the adjuster ratchet 44 such that rotation of the adjuster ratchet 44 tensions and untensions the parking brake cable 11. The adjuster ratchet 44 has a plurality of ratchet teeth 50 which are spaced in a side-by-side manner to form an arcuate row of the ratchet teeth 50.

The adjuster pawl 46 is connected with the operating lever 14 such that the adjuster pawl 46 is carried by the operating lever 14 as the operating lever 14 pivots about the first pivot pin 20 such that it is pivotable about the first pivot axis 32. Additionally, the adjuster pawl 46 is pivotally connected to the operating lever 14 for pivotal movement relative to the operating handle 14. The illustrated adjuster pawl 46 is pivotally connected to the operating lever 14 by the second pivot pin 30 such that it is pivotable about the second pivot axis 34. The adjuster pawl 46 has at least one pawl tooth 52 adapted for releasable engagement with the ratchet teeth 50 of the adjuster ratchet 44 so that the adjuster ratchet 44 is fixed to the operating handle 14 for rotation therewith when the adjuster pawl 46 is engaged but is free to rotate relative to the operating handle 14 when the adjuster pawl 46 is out of engagement. An adjuster pawl spring member 54 is preferably provided to bias the adjuster pawl 46 toward engagement with the adjuster ratchet 44.

Figure 4:
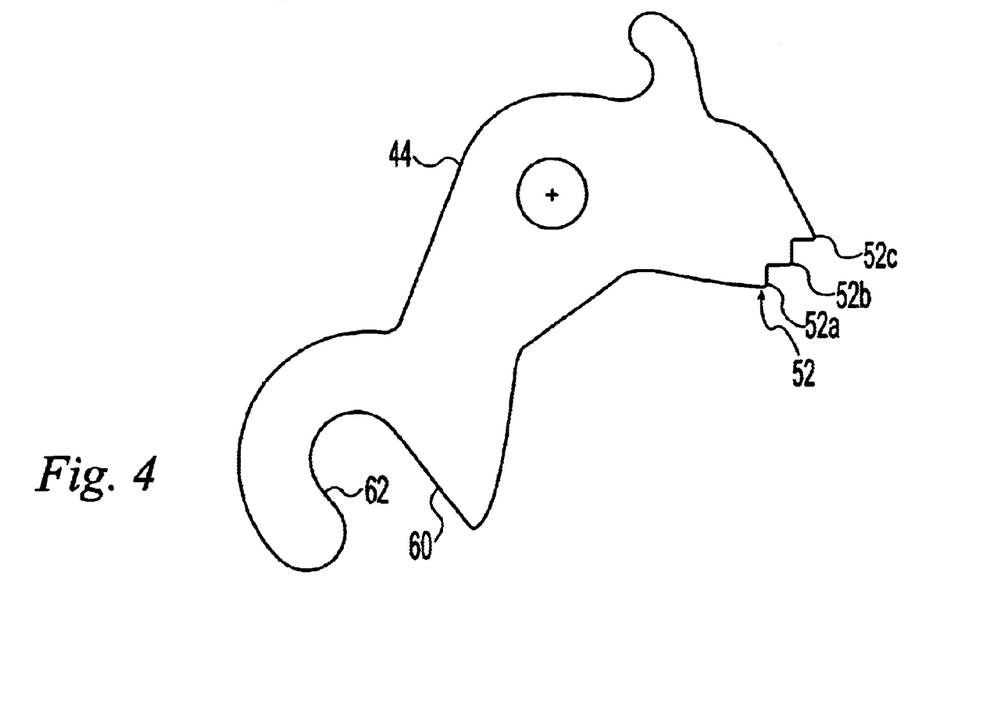
FIG. 4 is side elevational view of an adjuster pawl of the parking brake of FIGS. 1–3.

As best shown in FIG. 4, the illustrated adjuster pawl has three pawl teeth 52a, 52b, 52c which are spaced in a side-by-side manner to form a substantially linear row of ratchet teeth 52. Formed in this manner, the three pawl teeth 52 of the adjuster pawl 46 are adapted such that only one of the three pawl teeth 52 fully engages the ratchet teeth 50 of the adjuster ratchet 44 at any given time. That is, at any given time there is one active pawl tooth 52 which is in full load carrying engagement with the ratchet teeth 50 and two inactive pawl teeth 52 which are in no or partial load carrying engagement with the ratchet teeth 50 (best shown in FIG. 5 in which the center ratchet tooth 52b is the active tooth and the outer ratchet teeth 52a, 52c are not in full engagement). This arrangement ensures that there is an active ratchet tooth 52 upon deflection of components and or undesirable tolerance build-ups of components. The adjuster pawl 46 is preferably provided with an actuator 56 for pivoting the adjuster pawl 46. The illustrated actuator 56 includes a cam pin 58 fixed to the support 12 and a cam-out surface 60 formed on the adjuster pawl 46. The cam pin 58 and the cam-out surface 60 are adapted to cooperate such that the cam-out surface 60 engages the cam pin 58 to pivot the adjuster pawl 46 out of engagement with the adjuster ratchet 44 against the bias of the adjuster pawl spring member 54 when the operating lever 14 is in the brake-releasing position. The illustrated adjuster ratchet 46 is also provided with a cam-in surface 62 is adapted to cooperated with the cam pin 58 such that the cam-in surface 62 engages the cam pin 58 to pivot the adjuster pawl 46 into engagement with the adjuster ratchet 44 when the operating lever 14 is in the brake-engaging position.

Figure 5:
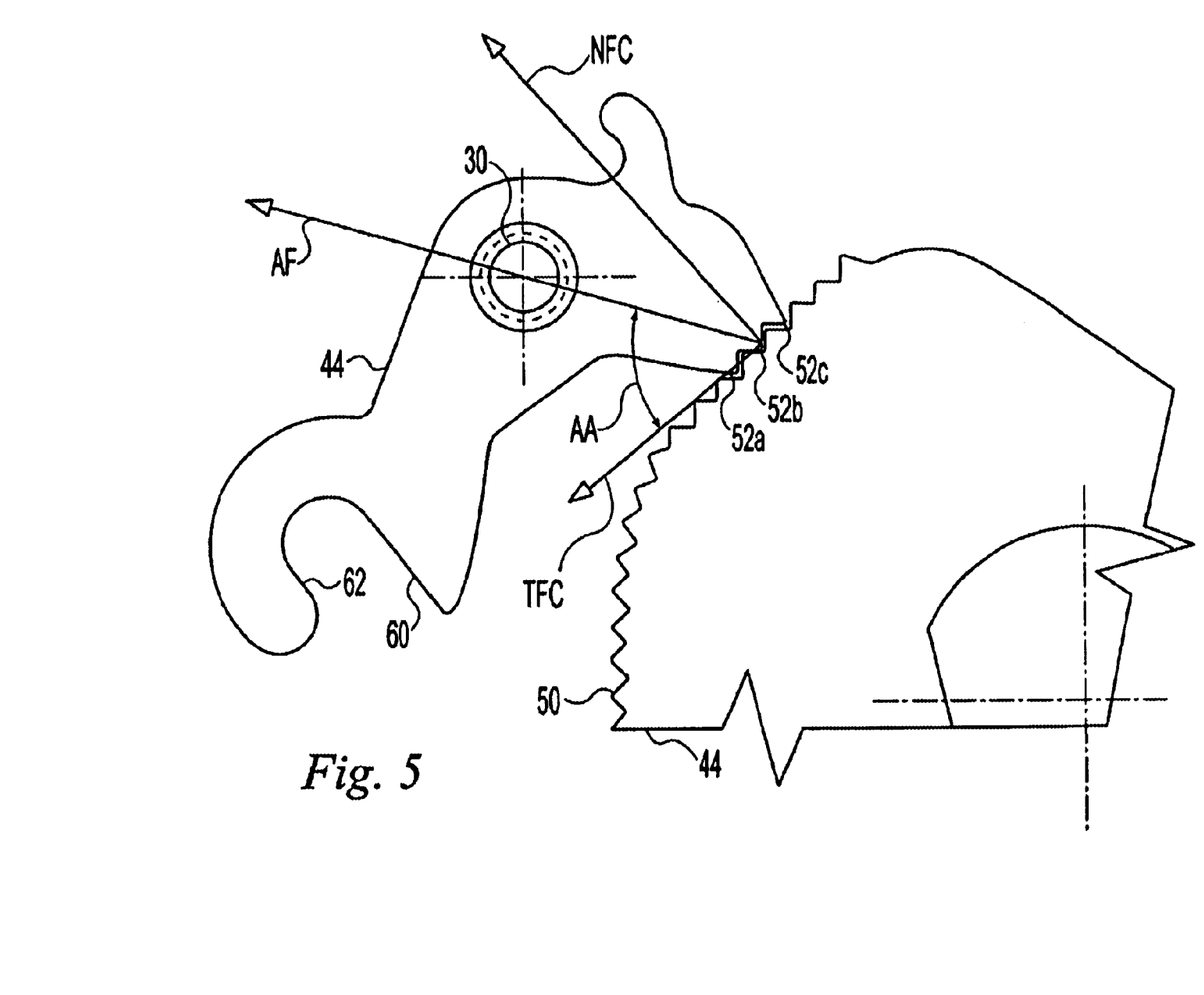
FIG. 5 is a an enlarged fragmental view of the parking brake of FIG. 1 in the area of the adjuster pawl with components removed for clarity.
Figure 6:
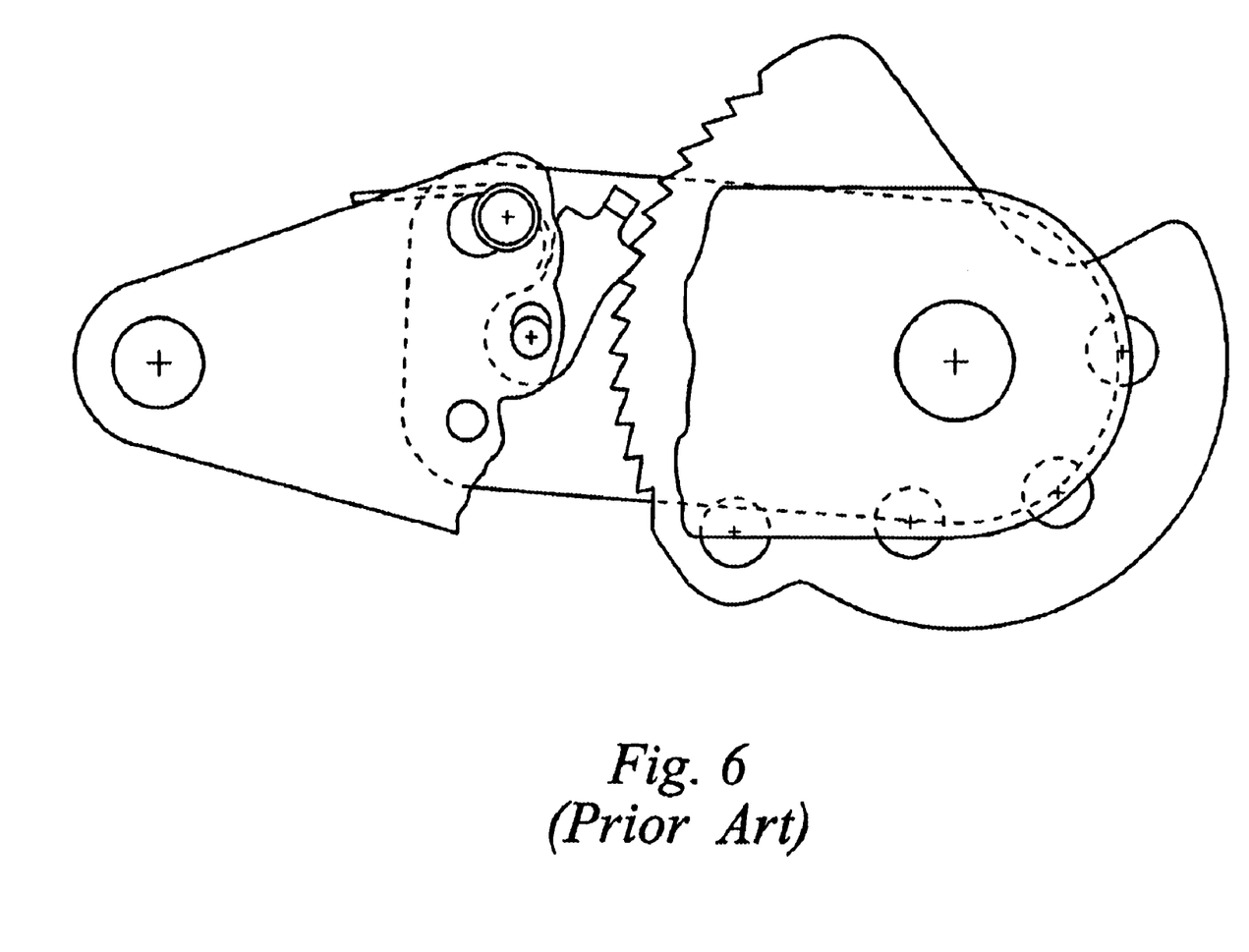
FIG. 6 is a fragmented view similar to FIG. 5 but showing a prior art adjuster pawl assembly.

As best shown in FIG. 5, the adjuster pawl 44 has an approach angle AA of greater than 45 degrees and preferably within the range of between about 55 degrees and about 75 degrees. The approach angle AA is the angle between the direction of the applied force AF, which extends from the contact point of the active pawl tooth 52 engaging the adjuster ratchet 44 to the pivot axis 34 of the adjuster pawl 46, and the direction of the tangential force component TFC of the applied force AF, which extends tangentially from the contact point of the active pawl tooth 52. It is noted that having an approach angle AA of greater than 45 degrees ensures that the normal force component NFC, which extends normal to the contact point of the active pawl tooth and is at a right angle from the tangential force component TFC, has a greater magnitude than the tangential force component TFC.

To apply the parking brake system 10, the operator grasps the hand grip 22 and pivots the operating lever in an upward direction about the first pivot axis 32 (clockwise as viewed in FIG. 1) to the brake engaging position. The locking mechanism 16 is adapted to allow this upward movement of the operating handle 14 but to prevent downward movement (counterclockwise as viewed in FIG. 1). As the operating lever pivots, the cam-out surface 60 of the adjuster pawl 62 disengages from the pivot pin 58 and the bias of the spring member 54 pivots the adjuster pawl 46 into engagement with the adjuster ratchet 44. Full engagement of one pawl tooth 52 of the adjuster pawl 46 with the adjuster ratchet 44 is ensured as the cam-in surface 62 engages the cam pin 58. With the adjuster pawl 46 engaging the adjuster ratchet 44, further rotation of the operating lever 14 rotates the adjuster ratchet 44 to pull and tension the parking brake cable 11 to engage the parking brake. With the operating lever 14 in the brake engaging position, engagement of the adjuster pawl 46 with the adjuster ratchet 44 prevents movement of the parking brake cable 11 relative to the operating lever 14 and engagement of the main pawl 26 with the main ratchet 24 prevents downward movement (counterclockwise as viewed in FIG. 1) of the operating lever 12 so that tension in the parking brake cable 11 is maintained.

To release the parking brake system 10, the operator grasps the hand grip 22, depresses the button 42 to disengage the main pawl 26 from the main ratchet 24, and pivots the operating handle in a downward direction (counterclockwise as viewed in FIG. 1). Rotation of the operating lever 14 rotates the adjuster ratchet 44 to untension the parking brake cable 11 and disengage the parking brake. As the cam-out surface 60 of the adjuster pawl 62 engages the pivot pin 58 and overcomes the bias of the spring member 54, the adjuster pawl 46 pivots out of engagement with the adjuster ratchet 44 once the operating lever reaches the brake releasing position. With the adjuster ratchet 44 disengaged from the operating lever 14, the adjuster ratchet spring member 48 biases the adjuster ratchet 44 in a slack-removing direction (clockwise as viewed in FIG. 1) to automatically remove any slack in the parking brake cable 11. With the operating lever in the brake releasing position, the operator, releases the button 42 and the main pawl spring member 38 returns the main pawl 26 into engagement with the main ratchet 24.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A self-adjusting parking brake system which automatically removes slack from a parking brake cable, said system comprising, in combination:
   a fixed support;
   a lever pivotably connected to said support for movement between brake-releasing and brake-engaging positions;
   a locking mechanism adapted to releasably maintain said lever in said brake-engaging position; said locking mechanism including:
      a main ratchet fixed relative to said support and having a plurality of ratchet teeth; and
      a main pawl pivotably connected with said lever and having a pawl-for releasable engagement with said ratchet teeth of said main ratchet;
   a self-adjust mechanism adapted to releasably connect the cable with said lever, said self-adjust mechanism including:
      an adjuster ratchet having a plurality of ratchet teeth and adapted for connection with the cable;
      an adjuster pawl pivotably connected with said lever and having three equally spaced pawl teeth adapted for releasable engagement with said ratchet teeth of the adjuster ratchet, said adjuster pawl being pivotable relative to said lever about a pivot axis; and
      a pawl spring member biasing said adjuster pawl toward engagement with said adjuster ratchet; and
   wherein said adjuster pawl has an approach angle extending between a tangential force direction and a force direction from a tooth contact point engaging the adjuster ratchet to the pivot axis of the adjuster pawl and wherein said approach angle is greater than 45 degrees.

2. The parking brake system according to claim 1, wherein said approach angle is within the range of about 55 degrees to about 75 degrees.

3. The parking brake system according to claim 1, wherein said lever is adapted for hand operation.

4. The parking brake system according to claim 1, wherein said three pawl teeth of the adjuster pawl are adapted such that only one of the three pawl teeth of the adjuster pawl fully engages the ratchet teeth of the adjuster ratchet at any given time when the lever is locked in the brake engaging position.

5. The parking brake system according to claim 4, wherein said three pawl teeth of said adjuster pawl are spaced side-by-side to form a substantially linear row and the plurality of ratchet teeth of said adjuster ratchet are spaced side-by-side to form a substantially arcuate row.

6. The parking brake system according to claim 1, further comprising a cam-out member connected to the support and adapted to pivot the adjuster pawl away from engagement with said adjuster ratchet when said lever is in the brake-releasing position.

7. The parking brake system according to claim 6, further comprising a cam-in member connected to the support and adapted to pivot the adjuster pawl toward engagement with said adjuster ratchet when said lever is in the brake-engaging position.

8. A self-adjusting parking brake system which automatically removes slack from a parking brake cable, said system comprising, in combination:
   a fixed support;
   a lever pivotably connected to said support for movement between brake-releasing and brake-engaging positions;
   a locking mechanism adapted to releasably maintain said lever in said brake-engaging position; said locking mechanism including:
      a main ratchet fixed relative to said support and having a plurality of ratchet teeth; and
      a main pawl pivotably connected with said lever and having a pawl tooth adapted for releasable engagement with said plurality ratchet teeth of said main ratchet;
   a self-adjust mechanism adapted to releasably connect the cable with said lever, said self-adjust mechanism including:
      an adjuster ratchet having a plurality of ratchet teeth and adapted for connection with the cable;
      an adjuster pawl pivotably connected with said lever and having a plurality of pawl teeth adapted for releasable engagement with said plurality of ratchet teeth of the adjuster ratchet; and
      a pawl spring member biasing said adjuster pawl toward engagement with said adjuster ratchet; and
   wherein said plurality of pawl teeth of the adjuster pawl are adapted such that only one of the plurality of pawl teeth of the adjuster pawl fully engages the plurality ratchet teeth of the adjuster ratchet at any given time when the lever is locked in the brake engaging position.

9. The parking brake system according to claim 8, wherein said adjuster pawl has three teeth.

10. The parking brake system according to claim 9, wherein said three pawl teeth of said adjuster pawl are spaced side-by-side to form a substantially linear row and the plurality of ratchet teeth of said adjuster ratchet are spaced side-by-side to form a substantially arcuate row.

11. The parking brake system according to claim 8, wherein said plurality of pawl teeth of said adjuster pawl are spaced side-by-side to form a substantially linear row and the plurality of ratchet teeth of said adjuster ratchet are spaced side-by-side to form a substantially arcuate centerline.

12. The parking brake system according to claim 8, wherein said adjuster pawl is pivotable relative to said lever about a pivot axis, said adjuster pawl has an approach angle extending between a tangential force direction and a force direction from a tooth contact point engaging the adjuster ratchet to the pivot axis of the adjuster pawl, and said approach angle is greater than 45 degrees.

13. The parking brake system according to claim 12, wherein said approach angle is within the range of about 55 degrees to about 75 degrees.

14. The parking brake system according to claim 8, wherein said lever is adapted for hand operation.

15. The parking brake system according to claim 8, further comprising a cam-out member connected to the support and adapted to pivot the adjuster pawl away from engagement with said adjuster ratchet when said lever is in the brake-releasing position.

16. The parking brake system according to claim 8, further comprising a cam-in member connected to the support and adapted to pivot the adjuster pawl toward engagement with said adjuster ratchet when said lever is in the brake-engaging position.

17. A self-adjusting parking brake system which automatically removes slack from a parking brake cable, said system comprising, in combination:

a fixed support;

a hand-operated lever pivotably connected to said support for movement between brake-releasing and brake-engaging positions;

a locking mechanism adapted to releasably maintain said lever in said brake-engaging position; said locking mechanism including:
 a main ratchet fixed relative to said support and having a plurality of ratchet teeth; and
 a main pawl pivotably connected with said lever and having a pawl tooth for releasable engagement with said plurality of ratchet teeth of said main ratchet;

a self-adjust mechanism adapted to releasably connect the cable with said lever, said self-adjust mechanism including:
 an adjuster ratchet having a plurality of ratchet teeth and adapted for connection with the cable;
 an adjuster pawl pivotably connected with said lever and having three pawl teeth adapted for releasable engagement with said ratchet teeth of the adjuster ratchet, said adjuster pawl being pivotable relative to said lever about a pivot axis; and
 a pawl spring member biasing said adjuster pawl toward engagement with said adjuster ratchet; and wherein said adjuster pawl has an approach angle extending between a tangential force direction and a force direction from a tooth contact point engaging the adjuster ratchet to the pivot axis of the adjuster pawl and wherein said approach angle is within the range of about 55 degrees to about 75 degrees; and wherein said three pawl teeth of the adjuster pawl are adapted such that only one of the three pawl teeth fully engages the plurality ratchet teeth of the adjuster ratchet at any given time when the lever is locked in the brake engaging position.

18. The parking brake system according to claim 17, wherein said three pawl teeth of said adjuster pawl are spaced side-by-side to form a substantially linear row and the plurality of ratchet teeth of said adjuster ratchet are spaced side-by-side to form a substantially arcuate row.

19. The parking brake system according to claim 1, wherein said pivot axis is at a fixed position on said lever.

20. The parking brake system according to claim 2, said approach angle is within the range of about 55 degrees to about 75 degrees for each of the three pawl teeth.

* * * * *